(12) United States Patent
Buerger et al.

(10) Patent No.: US 10,589,763 B2
(45) Date of Patent: Mar. 17, 2020

(54) METHOD AND MEASURING SYSTEM FOR REGISTERING A FIXED POINT ADJACENT A TRACK

(71) Applicant: PLASSER & THEURER EXPORT VON BAHNBAUMASCHINEN GESELLSCHAFT M.B.H., Vienna (AT)

(72) Inventors: Martin Buerger, Linz (AT); Gerald Zauner, Wilhering (AT)

(73) Assignee: Plasser & Theurer Export von Bahnbaumaschinen Gesellschaft m.b.H., Vienna (AT)

( * ) Notice: Subject to any disclaimer, the term of this patent is extended or adjusted under 35 U.S.C. 154(b) by 0 days.

(21) Appl. No.: 16/083,047

(22) PCT Filed: Mar. 20, 2017

(86) PCT No.: PCT/EP2017/000351
§ 371 (c)(1),
(2) Date: Sep. 7, 2018

(87) PCT Pub. No.: WO2017/178093
PCT Pub. Date: Oct. 19, 2017

(65) Prior Publication Data
US 2019/0031217 A1    Jan. 31, 2019

(30) Foreign Application Priority Data
Apr. 15, 2016    (AT) .................................. A 199/2016

(51) Int. Cl.
*B61K 9/08* (2006.01)
*B61L 23/04* (2006.01)
(Continued)

(52) U.S. Cl.
CPC ................ *B61K 9/08* (2013.01); *B61L 23/04* (2013.01); *E01B 35/00* (2013.01); *G01C 11/06* (2013.01)

(58) Field of Classification Search
CPC ........... B61K 9/08; B61L 23/04; E01B 35/00; G01C 11/06
See application file for complete search history.

(56) References Cited

U.S. PATENT DOCUMENTS

2007/0213926 A1*  9/2007  Jager ...................... E01B 35/00
                                                        701/33.1
2017/0106885 A1*  4/2017  Singh .................... B61L 23/044

FOREIGN PATENT DOCUMENTS

DE    102006021040 A1   11/2007
WO      2014039747 A1    3/2014

OTHER PUBLICATIONS

A. Pantiushin, et al.; "Control Measurement System for Railway Track Position"; SPIE. ; vol. 8486.

* cited by examiner

*Primary Examiner* — Thai Q Tran
*Assistant Examiner* — Jose M Mesa
(74) *Attorney, Agent, or Firm* — Laurence A. Greenberg; Werner H. Stemer; Ralph E. Locher

(57) ABSTRACT

A method of determining the actual position of a track relative to a fixed point located in a lateral vicinity of the track by using a registering device being mobile on the track includes surveying the position of the fixed point relative to the track. The registering device is moved along the track, image pairs of the lateral vicinity of the track are continuously recorded by a stereo camera system on the registering device and the fixed point is searched for in the image pairs by pattern recognition carried out in an evaluation device. Upon recognition of the fixed point, the position of the fixed (Continued)

Figure 1:
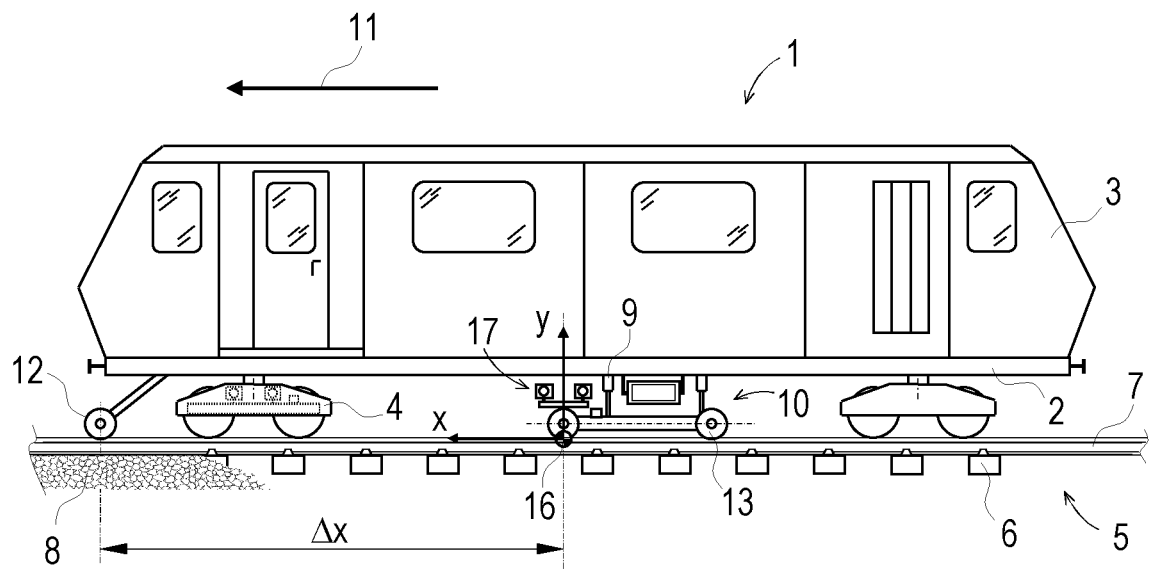

point relative to the track is determined by evaluating at least one image pair. This creates the possibility of surveying fixed points in passing with the configuration of the fixed point not being bound to any special form. A measuring system is also provided.

15 Claims, 2 Drawing Sheets

(51) Int. Cl.
    *E01B 35/00*     (2006.01)
    *G01C 11/06*     (2006.01)

METHOD AND MEASURING SYSTEM FOR REGISTERING A FIXED POINT ADJACENT A TRACK

BACKGROUND OF THE INVENTION

Field of the Invention

The invention relates to a method of determining the actual position of a track relative to a fixed point, located in a lateral vicinity of the track, by means of a registering device mobile on the track, wherein the position of the fixed point relative to the track is surveyed. The invention further relates to a measuring system for carrying out the method.

Description of the Related Art

The local position of a track embedded in ballast is influenced by being travelled on and by effects of the weather. Therefore, for checking a current track position and particularly prior to maintenance operations, measurements take place regularly by means of a measuring car provided especially for that purpose, or by means of a track maintenance machine.

Known measuring methods use fixed points situated adjacent to the track which are mounted on stationary facilities such as utility poles. As a rule, a fixed point is defined as the tip of a marking bolt. The position of each fixed point relative to the track is documented in directories. Thus, a target position for the track is determined, in particular for circular and transition curves as well as gradient changes. Also, intermediate fixed points are often arranged between main points.

From EP 0 511 191 A2, a device for measuring the distance between a track and a fixed point is known. In this, the device is moved into a position in front of a fixed point, and a distance-measuring laser sensor is aligned with the fixed point by means of a sighting telescope.

In AT 514502 A1, a method of determining a target position of a track by means of a fixed point is disclosed, wherein each fixed point is connected to a scanning aid and the track vicinity is constantly scanned by a rotating laser. From a recorded point cloud of the scanning aid, the position of the associated fixed point with respect to the track is calculated.

SUMMARY OF THE INVENTION

It is the object of the invention to further develop methods known from the prior art. Additionally, a correspondingly improved measuring system is to be indicated.

According to the invention, this object is achieved with a method and a measuring system described below. Dependent claims indicate advantageous embodiments of the invention.

During this, the registering device is moved along the track, wherein image pairs of the lateral vicinity of the track are continuously recorded by means of a stereo camera system arranged on the registering device, wherein the fixed point is searched for in the image pairs by means of a pattern recognition carried out in an evaluation device, and wherein—upon identification of a fixed point—the position of the fixed point relative to the track is determined by evaluation of at least one image pair.

In this manner, the possibility is created to survey fixed points in passing, wherein the design of the fixed point is not bound to any special shape. Even a two-dimensionally indicated fixed point can be recognized with this method. Additionally, as a result of the wide registration area of the stereo camera system, the fixed point recognition is ensured also at high speeds since the lateral vicinity is depicted continuously.

A further development of the invention provides that, by means of an inertial measuring unit, the position of the registering device relative to a stationary reference system is registered continuously, and that a drift resulting in the process is corrected by means of the determined position of the fixed point. A measuring method which thus calibrates itself continuously is suitable for automatic surveying of the track with high precision.

It is further advantageous if a super-elevation position of the registering device is measured and included in determining the position of the fixed point. Thus, a super-elevation normal in curves is taken into account in a simple manner and has no influence on the result of determining the position of the fixed point.

A further advantageous embodiment provides that an identification affixed next to the fixed point is recorded and evaluated. In this manner, on the basis of the identification, the recognized fixed point can be immediately associated with an entry in the directory and can be linked with stored data.

In order to further enhance the precision of the method, it is useful if, during passing by, image pairs of the fixed point are recorded from several recording positions, and if the position of the fixed point relative to the track is evaluated in several image pairs. Thus, several position data of the fixed point are available for further data processing.

Favorably in this, a common coordinate system is specified in which the coordinates of several recording positions are established, wherein the position coordinates of the fixed point determined in the respective recording position are transformed into the common coordinate system. The then available redundant position data of the fixed point are joined into a result.

In a simple manner, this is accomplished in that, for indicating the position of the fixed point, an averaged coordinate value for each axis of the common coordinate system is calculated from several transformed coordinate values. By forming a weighted mean value, evaluations containing errors can be masked out.

A further improvement of the method provides that the registering device is moved on the rails of the track by means of flanged rollers, and that during this the flanged rollers are pressed laterally against the rails. Thus it is ensured that the position of the registering device relative to the rails is unequivocally defined. For evaluating the position of the fixed point, a reference system is specified, the origin of which lies in a wheel flange contact point of the pressed-on registering device.

In a different embodiment, the position of the registering device relative to a rail is measured continuously by means of a measuring device. Thus, the registering device can be arranged on an on-track undercarriage of a measuring car or of a track maintenance machine, the position of which relative to the rail is not clearly defined. In this case also, a coordinate system having an unequivocally defined wheel flange contact point as origin serves as a reference system for determining the position of the fixed point. In this, the position of the fixed point relative to the track as determined by the registering device is corrected with the registered measuring values of the measuring device.

For high quality of the image data, it is advantageous if the lateral vicinity of the track is illuminated by means of an infrared spotlight, and if the image pairs are recorded by means of an infrared filter.

A measuring system according to the invention for carrying out one of the above-mentioned methods comprises a fixed point positioned in a lateral vicinity of the track and a registering device, mobile on the track, for surveying the position of the fixed point relative to the track. In this, a stereo camera system for recording image pairs of the lateral vicinity of the track is arranged on the registering device, wherein the stereo camera system is connected to an evaluation device which determines the position of the fixed point relative to the track by means of at least one image pair.

A further development of the measuring system envisages that an inertial measuring unit is arranged on the registering device. This serves for continuous position determination of the registering device relative to a stationary reference system and can be used also for measuring a super-elevation.

In addition, it is advantageously envisaged that the registering device is designed as a component of a track maintenance machine or a measuring car. For example, the registering device is mounted on a machine frame by means of a suspension having a drive and can be lowered onto the track when needed. Otherwise the registering device remains in a raised position so that the flanged rollers are not subject to wear. Alternatively, the registering device including a measuring device for continuous measuring of the distance to the rail is attached directly to an on-track undercarriage of the track maintenance machine or the measuring car. In this manner, higher working speeds can be realized.

Here it is useful if the track maintenance machine or the measuring car comprises a displacement transducer for measuring a distance travelled on the track. Either a separate measuring wheel is provided as displacement transducer, or a wheel of an undercarriage of the track maintenance machine or the measuring car is equipped with a rotary encoder.

In order to ensure a reliable recognition of the fixed point even under difficult conditions, it is advantageous if the fixed point includes redundant elements.

DESCRIPTION OF THE INVENTION

The invention will be described by example below with reference to the attached figures. There is shown in schematic representation in:

FIG. 1 a side view of a measuring car with a registering device

Figure 2:
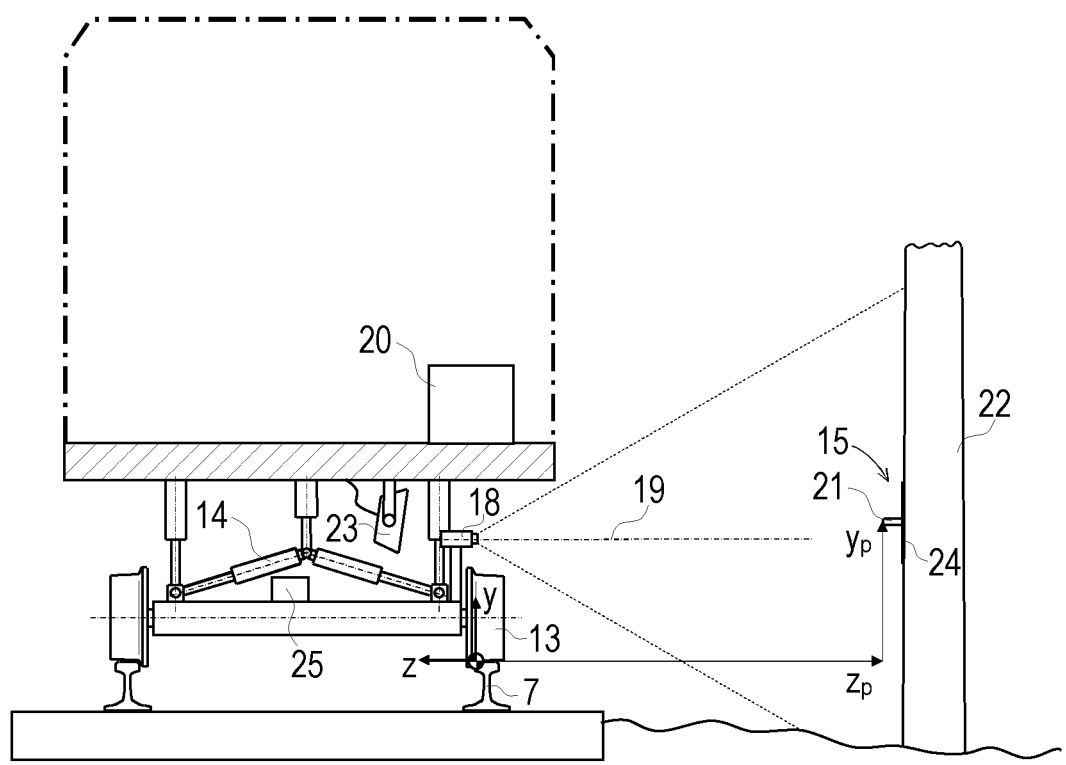

FIG. 2 a sectional view of the measuring car with registering device

Figure 3:
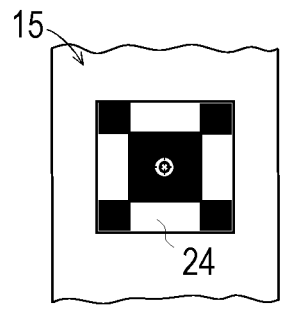

FIG. 3 a fixed point with a redundant element

Figure 4:
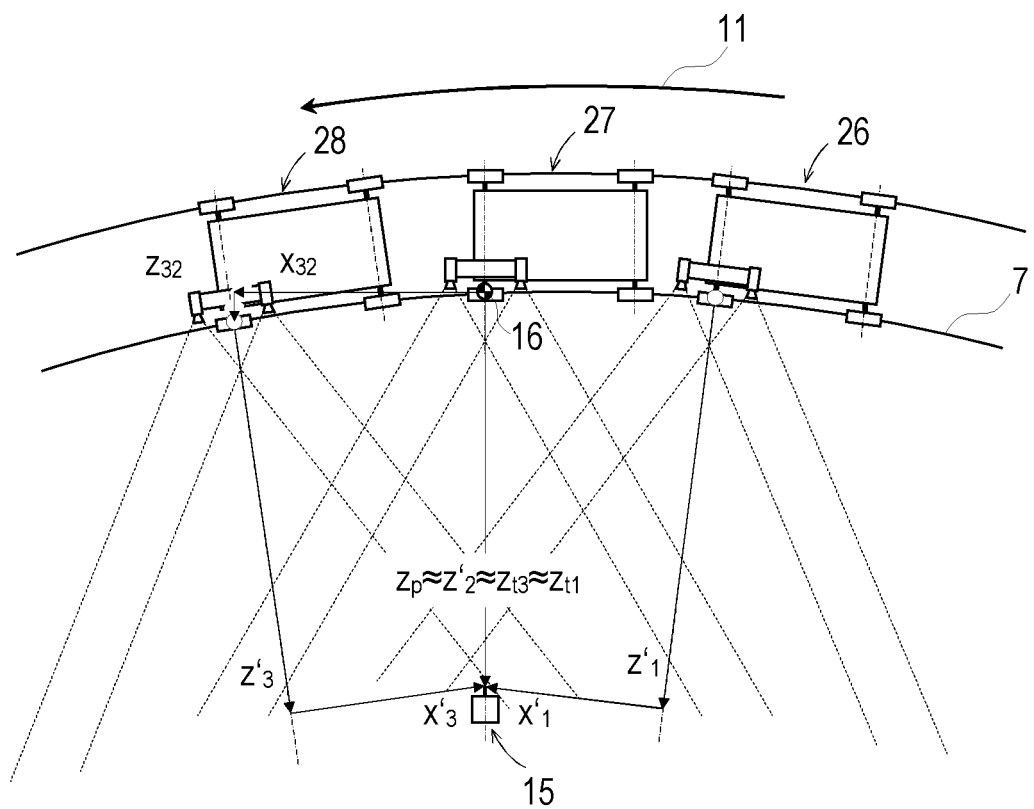

FIG. 4 a registering device in three recording positions

DESCRIPTION OF THE EMBODIMENTS

The measuring car 1 comprises a car body 3, built on a machine frame 2, which is supported on two undercarriages 4. By means of these undercarriages 4, the measuring car 1 is mobile on a track 5. The track 5 consists of two rails 7 fastened to sleepers 6 and is supported in a ballast bed 8.

A registering device 10 is fastened to the machine frame 2 by means of a movable suspension 9. For a measuring operation, the registering device 10 is lowered upon the track 5, as shown. During transfer travel, it is pulled up and locked.

At the front of the measuring car 1, as seen in the travelling direction 11, a displacement transducer 12 designed as a measuring wheel is installed to record a distance covered. Alternatively, a wheel of an undercarriage 4 could also be equipped with a displacement transducer 12 (Distance Measurement Indicator DMI). The displacement transducer 12 emits impulses representing fractions of the wheel revolutions.

In the embodiment shown, the registering device 10 includes flanged rollers 13 which are pressed laterally against the rails 7 by means of a pressing device 14. In this, a coordinate system having three axes x, y, z is specified as a reference system for the evaluation of the position of a fixed point 15, with the origin 16 of the coordinate system lying in the wheel flange contact point of the left front flanged roller 13 (as seen in the travelling direction 11). Due to the flanged roller 13 being pressed laterally against the rail 7, this point 16 is always precisely defined.

In a different embodiment, the registering device 10 is mounted on an undercarriage 4 (shown in FIG. 1 in dashed lines at the front undercarriage 4) and oscillates sinusoidal transversely to the travelling direction 11 relative to the rail 7. A defined wheel flange contact point serves here as origin 16 of a reference system. Usually, the same is assumed as the point of intersection of the inner rail contour and a horizontal straight line extending 14 mm below the rail upper edge. With this kind of arrangement, it is possible to realize higher working speeds as compared to an embodiment with pressed-on flanged rollers.

Arranged on the registering device 10 or on the undercarriage 4 is a measuring device which continuously measures the movement of the registering device 10 relative to a rail 7. This is, for example, an optical gauge measurement system (Optical Gauge Measurement System, OGMS). A measured relative displacement of the registering device 10 versus the defined rail contact point is included in the calculation of the position of the registered fixed point 15.

Favorably also, the travelled path to be documented is correlated to the coordinate system with the wheel flange contact point as origin 16. In this, a value measured by the displacement transducer 12 is reduced by a constant distance Δx between displacement transducer 12 and the coordinate origin 16.

Arranged as a picture-taking component of the registering device 10 is a stereo camera system 17. The latter comprises two cameras 18 which are precisely aligned with one another, wherein an axis of symmetry of the stereo camera system 17 favorably extends through the coordinate origin 16. Specifically, the optical axes 19 of the two cameras 18 are aligned parallel to one another in the direction of the lateral vicinity of the track 5.

The method according to the invention uses the stereo camera system 17 to continuously record image pairs of the lateral vicinity while traveling past. For evaluation of the image pairs, the stereo camera system 17 is connected to an evaluation device 20. This is, for example, an industrial computer which has been set up particularly for this purpose.

In the evaluation device 20, an automated pattern recognition process takes place in order to recognize a fixed point 15 in the recorded image pairs. For such matching, algorithms are known which deliver reliable results in real time. Usually, the fixed point 15 is positioned as a marking bolt 21 on a stationary installation 22 beside the track, for example a utility pole.

In order to avoid interference by sunlight or lighting fixtures, it is useful if the lateral environment of the track 4 to be registered is illuminated by means of an infrared beam 23. The cameras 18 are then provided with infrared filters for filtering the light from other sources.

For reliably registering the fixed point 15, it is further helpful if the latter is equipped with redundant elements, as shown FIG. 3. Located in the center of the geometrical figure is the marking bolt 21 shown in a front view. In this, the position of the fixed point 15 is defined by the center point of the visible face side of the marking bolt 21. Redundant elements are provided on a panel 24 at the base of the marking bolt 21. In the present example, the corner points of the squares form redundant reference points for the position of the fixed point 15. Even if parts of the panel 24 are obscured by dirt or plants, enough reference points remain for an evaluation, as a rule.

As soon as the fixed point 15 has been recognized in an image pair, in a next method step the evaluation of position informations of the fixed point 15 takes place by means of photogrammetry. In this, a two-image evaluation ensues on the basis of the parallaxes and a known base distance between the cameras 18. Here again, algorithms are known which enable an evaluation in real time.

As a rule, at first coordinates are determined in a camera-internal reference system, and subsequently a transformation to the specified coordinate system takes place. Shown in FIG. 2 as a result are the y-coordinate $y_p$ and the z-coordinate $z_p$ of the fixed point 15. If the track 5 has a super-elevation, the same is to be taken into account when calculating the coordinates $y_p$, $z_p$. Advantageously, the super-elevation is determined by means of an inertial measuring unit 25 (IMU) mounted on the registering device 10.

In order to increase the precision of this evaluation step, a high resolution of the cameras 18 is useful. Additionally, short shutter speeds should be selected, wherein this stipulation depends on the travel speed of the registering device 10. This also influences the frame rate of the cameras 18. At a speed of 80 km/h, experiments with frame rates of 140 image pairs per second have delivered very good results.

As shown in FIG. 4, several image pairs of the fixed point 15 are recorded and evaluated during a passing-by. Thus, several position information data from different recording positions 26, 27, 28 are known for the fixed point 15. A merging of these position information data by transformation to a common coordinate system enhances the precision of the result.

Such a transformation of the z-coordinate of the fixed point 15 is explained by means of the coordinates $x'_1$, $z'_1$, $z'_2$, $x_{32}$, $z_{32}$, $z'_3$, $x'_3$ shown in FIG. 4. In this, for example, the wheel flange contact point of the left front flanged roller 13 at the time of the shown middle recording position 27 is defined as origin 16 of the common coordinate system. The x-coordinate of the fixed point 15 here equals zero.

To transform the z-coordinate $z'_3$ of the fixed point 15 relative to the next recording position 28 into the common coordinate system, the position of the recording position 28 in relation to said coordinate system must first be determined. This takes place, for example, by means of the inertial measuring unit 25 and results in a corresponding x-coordinate $x_{32}$ and a z-coordinate $z_{32}$. If the track 5 has a gradient or a super-elevation ramp, a corresponding y-value results also.

If the coordinates are interpreted as vectors, the following relationship ensues as transformed z-coordinate $z_{t3}$ of the fixed point 15:

$$\vec{Z_{t3}} = \vec{X_{32}} + \vec{Z_{32}} + \vec{Z'_3} + \vec{X'_3}$$

In the evaluation device 20, a corresponding algorithm for coordinate transformation is set up. A transformed z-coordinate $z_{t1}$ results also for the z-coordinate $z'_1$ of the fixed point 15 with regard to the previous recording position 26.

By forming a mean value of all transformed z-coordinates $z_{t1}$, $z_{t3}$ and the z-coordinate $z'_2$ registered in the common coordinate system, a precise z-coordinate $z_p$ of the fixed point 15 results. Individual faulty recordings due to, for instance, a pixel jump, dirt particles or insufficient lighting are compensated in this way. In practice, far more than 3 image pairs of the fixed point 15 are recorded at a high frame rate, as a result of which a sufficient number of position data for forming a mean value are available.

In an optional further method step, the registered position of the fixed point 15 is used to synchronize the position of the measuring car 1 which is continuously determined by means of the inertial measuring unit 25 and the displacement transducer 12. Specifically, at the start of a measuring run, the position of the measuring car 1 relative to a stationary reference system is defined. Starting from this original position, the inertial measuring unit 25 and the displacement transducer 12 register the relative position changes of the measuring car 1, wherein according to experience a drift occurs.

Since a fixed point 15 also represents a stationary reference point, said drift is determined and eliminated by the automatized surveying of the fixed point 15 during the measuring run. Usually several fixed points 15 are installed along a measuring path, so that, due to recurring matching, precise position data of the measuring car 1 are available over the entire measuring path.

The same method is intended for track maintenance machines such as tamping machines, for example. Here, the actual position of the track 5 is measured before it is brought into its target position by lifting, lining and tamping.

The invention claimed is:

1. A method of determining the actual position of a track relative to a fixed point located in a lateral vicinity of the track, the method comprising the following steps:
    providing a registering device being mobile on the track for surveying the position of the fixed point relative to the track;
    moving the registering device along the track while continuously recording image pairs of the lateral vicinity of the track by using a stereo camera system disposed on the registering device;
    searching for the fixed point in the image pairs by pattern recognition carried out in an evaluation device; and
    upon identification of the fixed point, determining the position of the fixed point relative to the track by evaluation of at least one of the image pairs.

2. The method according to claim 1, which further comprises using an inertial measuring unit to continuously register a position of the registering device relative to a stationary reference system, and correcting a resulting drift by using the determined position of the fixed point.

3. The method according to claim 1, which further comprises measuring a super-elevation position of the registering device and including the super-elevation position in determining the position of the fixed point.

4. The method according to claim 1, which further comprises recording and evaluating an identification affixed next to the fixed point.

5. The method according to claim 1, which further comprises recording image pairs of the fixed point from a plurality of recording positions while passing by, and evaluating the position of the fixed point relative to the track in a plurality of image pairs.

6. The method according to claim 5, which further comprises establishing coordinates of a plurality of recording positions in a common coordinate system, and transforming position coordinates of the fixed point determined in the respective recording position into the common coordinate system.

7. The method according to claim 6, which further comprises calculating an averaged coordinate value for each axis of the common coordinate system from a plurality of transformed coordinate values for indicating the position of the fixed point.

8. The method according to claim 1, which further comprises using flanged rollers to move the registering device on rails of the track while pressing the flanged rollers laterally against the rails.

9. The method according to claim 1, which further comprises using a measuring device to continuously measure a position of the registering device relative to a rail of the track.

10. The method according to claim 1, which further comprises using an infrared spotlight to illuminate the lateral vicinity of the track, and using an infrared filter to record the image pairs.

11. A measuring system for determining the actual position of a track, the measuring system comprising:

a fixed point positioned in a lateral vicinity of the track;
a registering device being mobile on the track for surveying a position of said fixed point relative to the track;
a stereo camera system disposed on said registering device for recording image pairs of the lateral vicinity of the track; and
an evaluation device connected to said stereo camera system for determining the position of said fixed point relative to the track based on at least one of the image pairs.

12. The measuring system according to claim 11, which further comprises an inertial measuring unit disposed on said registering device.

13. The measuring system according to claim 11, wherein the registering device is a component of a track maintenance machine or a measuring car.

14. The measuring system according to claim 13, which further comprises a displacement transducer for measuring a distance travelled by the track maintenance machine or the measuring car on the track.

15. The measuring system according to claim 11, wherein said fixed point includes redundant elements.

* * * * *